United States Patent
Hochmuth et al.

(10) Patent No.: US 7,903,119 B2
(45) Date of Patent: Mar. 8, 2011

(54) COMPRESSION OF IMAGE REGIONS ACCORDING TO GRAPHICS COMMAND TYPE

(75) Inventors: Roland M. Hochmuth, Fort Collins, CO (US); John Marks, Fort Collins, CO (US); David Pinedo, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1449 days.

(21) Appl. No.: 10/977,055

(22) Filed: Oct. 29, 2004

(65) Prior Publication Data
US 2006/0093230 A1    May 4, 2006

(51) Int. Cl.
    *G06T 15/20* (2006.01)
(52) U.S. Cl. .................. 345/522; 345/555
(58) Field of Classification Search .......... 345/522, 345/555
    See application file for complete search history.

(56) References Cited

U.S. PATENT DOCUMENTS

| | | | | |
|---|---|---|---|---|
| 6,031,939 A * | 2/2000 | Gilbert et al. | | 382/239 |
| 6,122,403 A * | 9/2000 | Rhoads | | 382/233 |
| 6,278,791 B1 * | 8/2001 | Honsinger et al. | | 382/100 |
| 6,496,601 B1 * | 12/2002 | Migdal et al. | | 382/239 |
| 6,744,919 B2 * | 6/2004 | Said | | 382/166 |
| 6,897,977 B1 * | 5/2005 | Bright | | 358/1.18 |
| 7,427,988 B2 * | 9/2008 | Vienneau et al. | | 345/473 |
| 2002/0154140 A1 * | 10/2002 | Tazaki | | 345/620 |
| 2002/0157105 A1 * | 10/2002 | Vienneau et al. | | 725/105 |
| 2003/0017846 A1 * | 1/2003 | Estevez et al. | | 455/556 |
| 2004/0001106 A1 * | 1/2004 | Deutscher et al. | | 345/838 |
| 2004/0044894 A1 * | 3/2004 | Lofgren et al. | | 713/176 |
| 2004/0091162 A1 * | 5/2004 | Donahue et al. | | 382/245 |
| 2004/0091243 A1 * | 5/2004 | Theriault et al. | | 386/52 |
| 2005/0289133 A1 * | 12/2005 | Arrouye et al. | | 707/4 |
| 2006/0041840 A1 * | 2/2006 | Blair et al. | | 715/513 |
| 2006/0044599 A1 * | 3/2006 | Lipowitz et al. | | 358/1.15 |
| 2006/0107056 A1 * | 5/2006 | Bhatt et al. | | 713/176 |
| 2006/0238547 A1 * | 10/2006 | Spencer et al. | | 345/619 |
| 2007/0168413 A1 * | 7/2007 | Barletta et al. | | 709/203 |

OTHER PUBLICATIONS

Modeling by example Thomas Funkhouser, Michael Kazhdan, Philip Shilane, Patrick Min, William Kiefer, Ayellet Tal, Szymon Rusinkiewicz, David Dobkin Aug. 2004 ACM Transactions on Graphics (TOG), ACM SIGGRAPH 2004 Papers SIGGRAPH '04, vol. 23 Issue 3 Publisher: ACM Press.*
Animated art & presentations: On creating animated presentations Douglas E. Zongker, David H. Salesin Jul. 2003 Proceedings of the 2003 ACM SIGGRAPH/Eurographics symposium on Computer animation SCA '03 Publisher: Eurographics Association.*
Secure data hiding in wavelet compressed fingerprint images Nalini K. Ratha, Jonathan H. Connell, Ruud M. Bolle Nov. 2000 Proceedings of the 2000 ACM workshops on Multimedia MULTIMEDIA '00 Publisher: ACM Press.*
Mastering M.S. Office 2000 professional Edition with ISBN 0-7821-2313-9 is cited in PTLO-892, pp. 570-571.* Said, Amir; Drukarev, A.; Image Processing, 1999. ICIP 99. Proceedings. Simplified segmentation for compound image compression 1999 International Conference on vol. 1, 1999 pp. 229-233 vol. 1.*
Optimizing block-thresholding segmentation for multilayer compression of compound images de Queiroz, Ricardo.L.; Zhigang Fan; Tran, T.D.; Image Processing, IEEE Transactions on vol. 9, Issue 9, Sep. 2000 pp. 1461-1471.*

* cited by examiner

*Primary Examiner* — Javid A Amini

(57) ABSTRACT

A method according to the invention conserves host system resources by compressing an image region according to the type of graphics command used to generate or modify the region. As an image is being rendered, a list of modified image regions is maintained. For each modified image region, metadata are associated with the region to identify the type of graphics command that was used to produce the modification. Per-region choices of compression algorithms can then be made responsive to the metadata without regard to the content of the image data itself.

36 Claims, 2 Drawing Sheets

COMPRESSION OF IMAGE REGIONS ACCORDING TO GRAPHICS COMMAND TYPE

FIELD OF THE INVENTION

This invention relates generally to computer graphics. More specifically, the invention relates to techniques for efficiently compressing frame buffer contents or other image data.

BACKGROUND

It is often beneficial to compress frame buffer contents or other image data. For example, in a networked environment in which frame buffer contents must be transmitted over a network from one computing device to another, compression of the frame buffer contents prior to transmission conserves network bandwidth. Compression of image data also helps to conserve the capacity of storage devices used to store the data.

As it happens, the efficiency of compression techniques varies depending on the types of image data to which they are applied. In addition, images differ with regard to the quality of compression that is required to process them in an acceptable manner. Consequently, it is known to pre-process a document prior to compressing it such that the document is decomposed into a number of regions. The contents of the image data contained within the regions are then analyzed so that the regions may be classified according to these contents. Once the regions have been so classified, different compression techniques may be applied to the different regions as appropriate. This technique enables greater efficiency to be achieved when compressing the document than could be achieved by using a single compression technique for the entire document. One decomposition and content-based classification scheme that has proved useful in this context is described in U.S. Pat. No. 6,744,919, titled "Classification of Blocks for Compression Based on Numbers of Distinct Colors" (hereinafter "the '919 patent").

One of the significant challenges in applying any, of the decomposition and classification techniques of the prior art, however, is their computational complexity. Because the techniques of the prior art consume significant amounts of memory and a significant number of processor cycles, they impact the performance of and increase the cost of the systems that utilize them.

SUMMARY OF THE INVENTION

In one aspect, a system according to the invention conserves host system resources by compressing image data based on the type of graphics command that was used to generate or modify the image data. As an image is being rendered, a list of modified image regions is maintained. For each modified image region, metadata are associated with the region to identify the type of graphics command that was used to produce the modification. Per-region choices of compression algorithms can then be made responsive to the metadata. For a given region, if the associated metadata indicates that the graphics command type used to modify the region satisfies predetermined criteria, then an efficient compression algorithm maybe chosen for the region without analyzing the contents of the image data contained within the region.

DETAILED DESCRIPTION OF THE PREFERRED EMBODIMENTS

Figure 1:
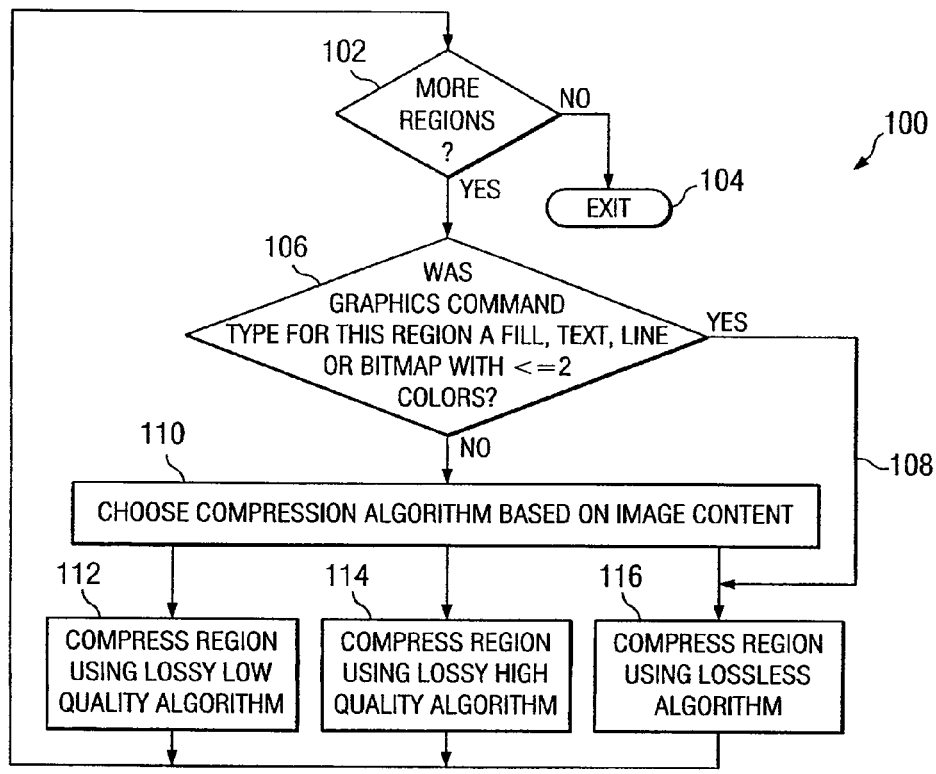
FIG. 1 is a flow diagram illustrating a method according to a preferred embodiment of the invention for compressing image data based on the type of graphics command that was used to generate or modify the image data.

FIG. 1 illustrates a method 100 according to a preferred embodiment of the invention for compressing image data based on the type of graphics command that was used to generate or modify the image data. Diamond 102 (and exit 104) indicate a loop during which plural regions within a frame buffer might be processed sequentially. It should be understood that method 100 also encompasses the case in which a single region would be processed-perhaps a single region containing an entire frame buffer. In diamond 106, metadata associated with a region is accessed. Preferably, the metadata includes an indication of a type of graphics command that was used to generate or modify image data contained in the region. A determination is made, using the metadata, as to whether the type of the graphics command satisfies at least one predetermined criterion. If the graphics command type does satisfy the at least one predetermined criterion, then a compression algorithm may be chosen for the region without regard to the content of the image data contained within the region, as indicated by arrow 108. On the other hand, if the graphics command type does not satisfy the at least one predetermined criterion, then a compression algorithm may be chosen for the region according to the content of the image data contained within the region, as indicated at block 110. Any method may be used to accomplish step 110, including for example the method disclosed in the '919 patent.

Numerous outcomes may result from block 110. Certain image data content may be compressed most effectively using a lossy low-quality compression algorithm. If the region being processed falls within such a category, then such a low-quality algorithm may be used to compress the region as indicated in block 112. Certain other image data content may be compressed most effectively using a lossy high-quality compression algorithm. If that is the case for the region being processed, then the region may be compressed using such a high-quality algorithm as indicated in block 114. Finally, other image data content can be most effectively compressed using a lossless compression algorithm such as, for example, a run-length style encoding scheme. If the region being processed falls in the latter category, then it may be compressed using a lossless algorithm as indicated in block 116.

As was discussed previously, it is computationally expensive to choose a compression algorithm based on the content of an image. Thus, one of the benefits of the inventive technique is that step 110 may be avoided if it is determined in step 106 that the graphics command type for the region being processed satisfies at least one predetermined criterion. Such a predetermined criterion might include, for example, whether the graphics command was a "fill," "text," "line" or "bitmap" type command, and whether the command involved not more than two colors. Other criteria may also be included, such as whether the graphics command was an "arc," "point" or "polygon" type command. Typically, regions rendered using these types of commands—especially those involving two or fewer colors—may be compressed using any of various run-length style compression algorithms such as classic run-length encoding, rise-run-length encoding or hextile encoding. Thus, if the determination made in step 106 is affirmative, then step 110 may be bypassed, and such a run-length-style compression algorithm maybe chosen to compress the region.

Figure 2:
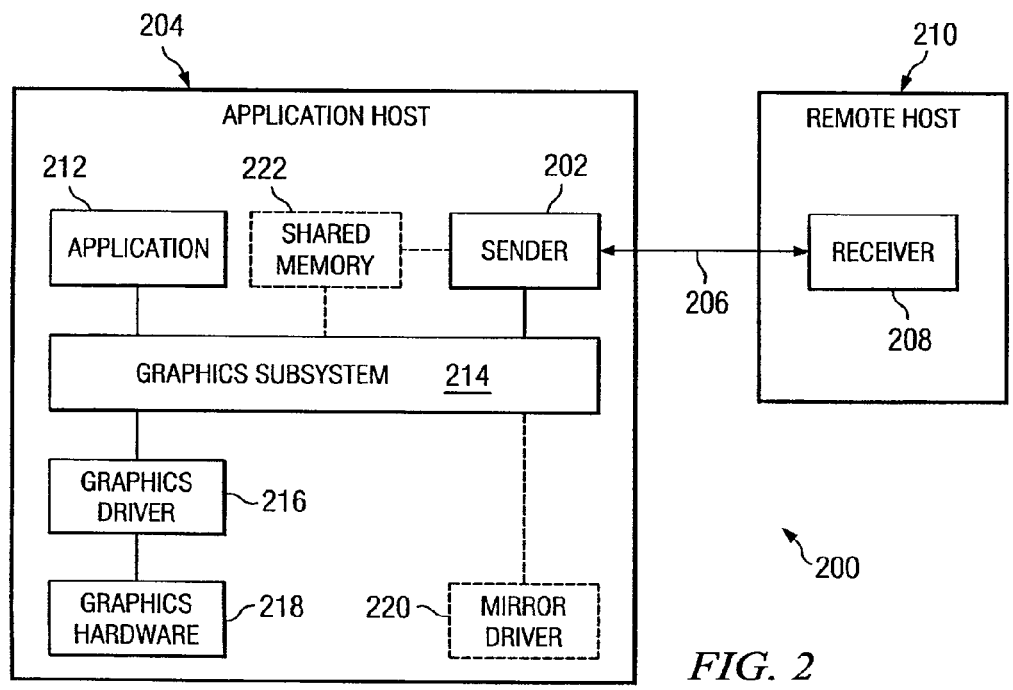
FIG. 2 is a block diagram illustrating, by way of example, numerous kinds of computer configurations that would be suitable for implementing embodiments of the invention.

Embodiments of the invention may be constructed for a variety of computing platforms and a variety of deployment configurations. FIG. 2 presents, by way of illustrative example and not by way of limitation, a representative number of such deployment configurations 200. In configurations 200, a sender process or daemon 202 in an application host 204 communicates via a network 206 with a receiver process or daemon 208 in one or more remote hosts 210. An application program 212 in host 204 generates graphics commands according to an application programming interface ("API"). A wide variety of API's may be employed for this purpose such as, for example, the graphics device interface ("GDI") promulgated by Microsoft Corporation, the Xwindow system interface ("X"), or the openGL ("OGL") interface promulgated by Silicon Graphics, Incorporated. Graphics commands issued by application 212 may be processed by a graphics subsystem 214. Processing of API graphics commands by graphics subsystem 214 may result in some optimization of the commands and generally results in a stream of driver-level graphics commands being issued to a graphics driver 216. In turn, graphics driver 216 signals graphics hardware system 218 appropriately to generate corresponding images on a display device.

In a first class of preferred embodiments, graphics subsystem 214 issues the graphics command stream not only to graphics driver 216, but also to an optional mirror driver 220. Mirror driver 220 does not necessarily control any graphics hardware, but may accumulate metadata about the command stream in a manner to be further detail below. It is believed that this class of embodiments will work well in a GDI environment. In such a case, the role of graphics subsystem 214 may be played by the operating system of host 204.

In a second class of preferred embodiments, graphics subsystem 214 may take the form of a modified X server or a modified OGL implementation. The modifications would include command wrappers that intercept graphics commands in the command stream. For example, if application 212 issued an XDrawLines command, an XDrawLines command wrapper would be invoked. The XDrawLines command wrapper would accumulate metadata about the command in an optional shared memory 222 in a manner to be further described below, and then would invoke the driver-level function or functions necessary to implement the originally-issued command.

Figure 3:
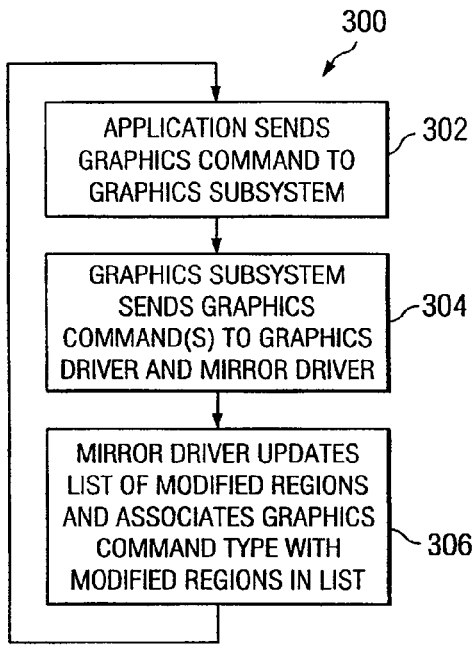
FIG. 3 is a flow diagram illustrating a first class of methods according to preferred embodiments of the invention for classifying image data based on the type of graphics command that was used to generate or modify the image data.

FIG. 3 illustrates a preferred method 300 for classifying image data within the context of the first class of embodiments described in FIG. 2. In method 300, application program 212 issues a stream of API graphics commands to graphics subsystem 214 as indicated in block 302. In block 304, graphics subsystem 214 processes the API commands and issues a corresponding stream of driver-level graphics commands to both graphics driver 216 and mirror driver 220. As mirror driver 220 receives the latter stream of commands, it updates a list of modified frame buffer regions in block 306.

As it does so, it associates graphics command types with the modified regions in the list. For example, suppose graphics subsystem 214 issued a "fill" type command to mirror driver 220. Mirror driver 220 would use x, y coordinates and size information included with the fill command to identify a frame buffer region that would be rendered in response to the fill command. Mirror driver 220 would then identify or create a metadata record for the identified region, and would store in this metadata record an indication that the graphics command type that was used to render into the region was a fill-type command.

Figure 4:
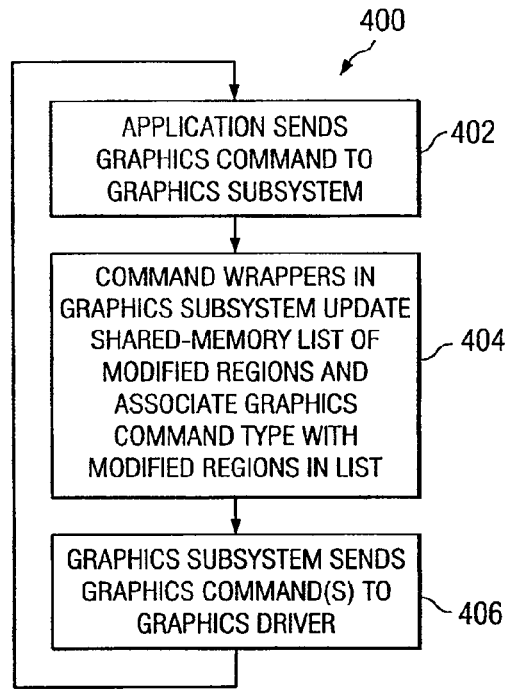
FIG. 4 is a flow diagram illustrating a second class of methods according to preferred embodiments of the invention for classifying image data based on the type of graphics command that was used to generate or modify the image data.

FIG. 4 illustrates a preferred method 400 for classifying image data within the context of the second class of embodiments described in FIG. 2. As in method 300, application program 212 issues a stream of API graphics commands to graphics subsystem 214 as indicated in block 402. In block 404, command wrappers intercept the stream of graphics commands. The command wrappers perform a function analogous to that of mirror driver 220: They update a list of modified frame buffer regions in shared memory 222, associating graphics command types with the modified regions in the list. Then, in block 406, they send driver-level commands that correspond to the intercepted API-level commands to graphics driver 216.

Figure 5:
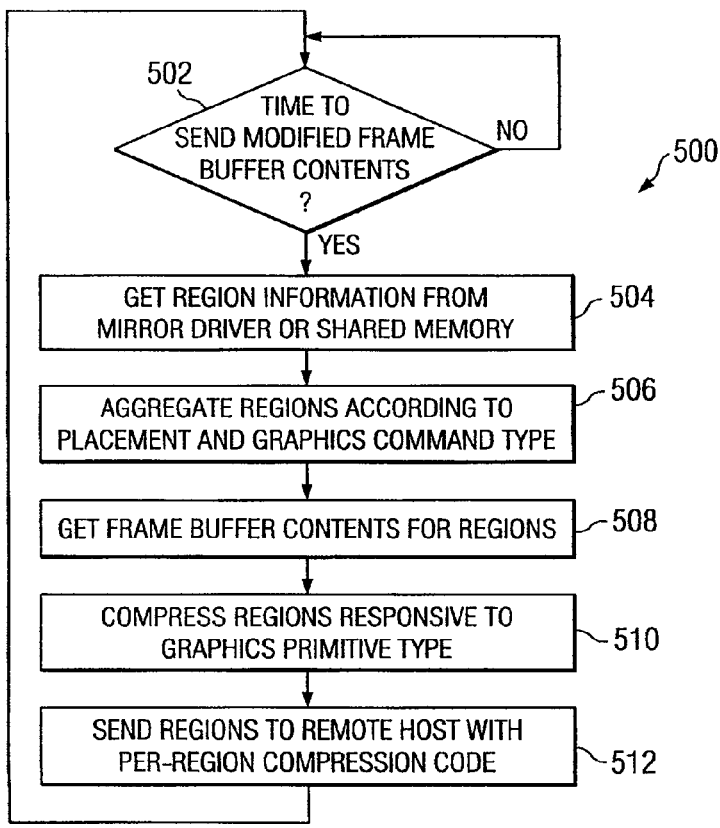
FIG. 5 is a flow diagram illustrating preferred behavior for the sender function of FIG. 2.

FIG. 5 is a flow diagram illustrating preferred behavior 500 for sender function 202. Sender 202 from time to time determines (as indicated in diamond 502) that it is time to send modified frame buffer contents to receiver 208. For example, receiver 208 may signal an update request to sender 202, or sender 202 may simply initiate a send operation in response to a change of frame buffer contents within application host 204. To prepare for such a send operation, in step 504 sender 202 accesses region information in the metadata being accumulated by mirror driver 220 or in shared memory 222. Then optionally, for efficiency, in step 506 sender 202 may aggregate these regions according to their x, y placement, their size, and the types of graphics commands associated with them. For example, sender 202 might join two adjacent "text" regions to form a super-region having an area larger than one or both of the component regions. In step 508, sender 202 accesses (typically from graphics hardware 218) the actual image data contained within the regions being processed. In step 510, sender 202 compresses the regions responsive to the types of graphics commands that are associated with the regions. To do so, it may implement method 100. Finally, in step 512, sender 202 sends the compressed regions to receiver 208 using a protocol that allows tagging each compressed region with an indicator for identifying the compression algorithm that was used to compress the region, or an algorithm that should be used to decompress the region. Any suitable code may be used to directly or indirectly provide this indication. Receiver 208 may then forward this information to a system within remote host 210 that will decompress the regions and render them into a frame buffer within the remote host for presentation on a display local to that host.

While the invention has been described in detail with reference to preferred embodiments thereof, the described embodiments have been presented by way of example and not by way of limitation. It will be understood by those skilled in the art that various changes may be made in the form and details of the described embodiments without deviating from the spirit and scope of the invention as defined by the appended claims.

What is claimed is:

1. A method of processing a region that contains image data, the method comprising:
   accessing, by a host device, metadata associated with the region, the metadata storing an indication of a type of graphics command that was used to generate or modify the image data;
   determining whether the type of graphics command satisfies predetermined criteria, the predetermined criteria including at least one of a plurality of image rendering commands and whether the at least one of the plurality of image rendering commands involved no more than two colors;
   if the type of graphics command satisfies the predetermined criteria, choosing a compression algorithm for the region based on the type of graphics command used to generate or modify the image data; and
   applying the compression algorithm in the region,
   wherein choosing the compression algorithm based on the type of graphics command avoids choosing the compression algorithm based on content of the image data in the region.

2. The method of claim 1, further comprising:
   if the type of graphics command does not satisfy the predetermined criteria, choosing a compression algorithm for the region based at least in part on content of the image data itself,
   wherein if the type of graphics command satisfies the predetermined criteria, the choosing of the compression algorithm based on the content of the image data is avoided.

3. The method of claim 1, wherein:
   the predetermined criteria include whether the graphics command type was a fill command type.

4. The method of claim 1, wherein:
   the predetermined criteria include whether the graphics command type was a text command type.

5. The method of claim 1, wherein:
   the predetermined criteria include whether the graphics command type was a line command type.

6. The method of claim 1, wherein:
   the predetermined criteria include whether the graphics command type was a bitmap command type.

7. The method of claim 6, wherein:
   the predetermined criteria include whether the bitmap command type involved not more than two colors.

8. The method of claim 1, wherein:
   choosing the compression algorithm for the region comprises choosing a lossless compression algorithm.

9. The method of claim 8, wherein:
   the lossless compression algorithm is one of a run-length algorithm, a rise-run-length algorithm, and a hextile algorithm.

10. The method of claim 1, wherein accessing the metadata comprises accessing the metadata accumulated by a component based on receiving the graphics command to generate or modify the image data.

11. A method of processing computer graphics data, comprising:
    accessing, by a host device, a graphics command from a stream of graphics commands;
    identifying a first region that the graphics command will modify;
    creating or locating a first metadata record for the first region;
    storing in the first metadata record an indication of a type of the graphics command;
    determining whether the type of graphics command satisfies at least one predetermined criterion;
    in response to determining that the type of graphics command satisfies the at least one predetermined criterion, choosing a compression algorithm responsive to the indication of the type of the graphics command in the first metadata record, rather than based on content of the first region; and
    compressing contents of the first region using the compression algorithm, the compression algorithm based on the type of graphics command.

12. The method of claim 11, further comprising:
    sending the compressed contents to a remote host with an indicator for identifying the compression algorithm or a corresponding decompression algorithm.

13. The method of claim 11, wherein:
    accessing the graphics command comprises sending the graphics command to a mirror driver in addition to a graphics driver.

14. The method of claim 13, wherein:
    storing the indication in the first metadata record is performed by the mirror driver.

15. The method of claim 11, wherein:
    accessing the graphics command comprises intercepting the graphics command with a command wrapper.

16. The method of claim 11, wherein:
    the at least one predetermined criterion includes whether the type of the graphics command was fill.

17. The method of claim 11, wherein:
    the at least one predetermined criterion includes whether the type of the graphics command was text.

18. The method of claim 11, wherein:
    the at least one predetermined criterion includes whether the type of the graphics command was line.

19. The method of claim 11, wherein:
    the at least one predetermined criterion includes whether the type of the graphics command was bitmap.

20. The method of claim 11, wherein:
    the at least one predetermined criterion includes whether the type of graphics command involved not more than two colors.

21. The method of claim 11, further comprising:
    accessing a second metadata record for a second region;
    responsive to information contained in the first and second metadata records, determining whether types of graphics commands used to create or modify the first and second regions satisfy the at least one predetermined criterion;
    if so, identifying an aggregated region that includes at least portions of the first and second regions, the aggregated region having an area larger than an area of the first region; and
    compressing contents of the aggregated region using the compression algorithm.

22. A computer system configured to process computer graphics data, comprising:
    a memory component that stores at least the following:
       logic for accessing a graphics command from a stream of graphics commands;
       logic for identifying a first region that the graphics command will modify;
       logic for creating or locating a first metadata record for the first region;
       logic for storing in the first metadata record an indication of a type of the graphics command;
       logic for determining whether the type of graphics command satisfies at least one predetermined criterion;

logic for choosing, in response to determining that the type of graphics command satisfies the at least one predetermined criterion, a compression algorithm responsive to the indication of the type of graphics command in the first metadata record, rather than based on content of the first region; and logic for compressing contents of the first region using the compression algorithm.

23. The computer system of claim 22, wherein:
the at least one predetermined criterion includes whether the type of the graphics command was fill.

24. The computer system of claim 22, wherein:
the at least one predetermined criterion includes whether the type of the graphics command was text.

25. The computer system of claim 22, wherein:
the at least one predetermined criterion includes whether the type of the graphics command was line.

26. The computer system of claim 22, wherein:
the at least one predetermined criterion includes whether the type of the graphics command was bitmap.

27. The computer system of claim 26, wherein:
the at least one predetermined criterion includes whether the bitmap command type involved not more than two colors.

28. A computer-readable storage medium storing instructions for processing a region that contains image data, the instructions when executed by a computer cause the computer to perform at least the following:

accessing metadata associated with the region, the metadata storing an indication of a type of graphics command that was used to generate or modify the image data, wherein the metadata was accumulated based on receiving the graphics command to generate or modify the image data;

determining whether the type of graphics command satisfies at least one predetermined criterion, the at least one predetermined criterion including whether the graphics command is one of a plurality of different types of image rendering commands;

if the type of graphics command satisfies the at least one predetermined criterion, choosing a compression algorithm for the region based on the type of graphics command used to generate or modify of the image data; and applying the compression algorithm on the region, wherein choosing the compression algorithm based on the type of graphics command avoids choosing the compression algorithm based on content of the image data in the region.

29. The computer-readable storage medium of claim 28, wherein the instructions when executed cause the computer to further perform:

if the type of graphics command does not satisfy the at least one predetermined criterion, choosing a compression algorithm for the region based at least in part on the content of the image data itself, wherein if the type of graphics command satisfies the at least one predetermined criterion, the choosing of the compression algorithm based on the content of the image data is avoided.

30. The computer-readable storage medium of claim 28, wherein:
the at least one predetermined criterion includes whether the graphics command type was a fill command type.

31. The computer-readable storage medium of claim 28, wherein:
the at least one predetermined criterion includes whether the graphics command type was a text command type.

32. The computer-readable storage medium of claim 28, wherein:
the at least one predetermined criterion includes whether the graphics command type was a line command type.

33. The computer-readable storage medium of claim 28, wherein:
the at least one predetermined criterion includes whether the graphics command type was a bitmap command type.

34. The computer-readable storage medium of claim 33, wherein:
the at least one predetermined criterion includes whether the bitmap command type involved not more than two colors.

35. The computer-readable storage medium of claim 28, wherein:
choosing the compression algorithm for the region comprises choosing a lossless compression algorithm.

36. The computer-readable storage medium of claim 35, wherein:
the lossless compression algorithm is one of a run-length algorithm, a rise-run-length algorithm, and a hextile algorithm.

* * * * *